United States Patent [19]

Shiomi et al.

[11] 4,386,991

[45] Jun. 7, 1983

[54] METHOD OF BONDING 4-METHYL-1-PENTENE POLYMERS

[75] Inventors: Teiichi Shiomi, Otake; Katsumi Funakoshi, Iwakuni, both of Japan

[73] Assignee: Mitsui Petrochemical Industries, Ltd., Tokyo, Japan

[21] Appl. No.: 234,206

[22] Filed: Feb. 13, 1981

[30] Foreign Application Priority Data

Feb. 18, 1980 [JP] Japan .................................. 55-17807
Jan. 16, 1981 [JP] Japan .................................. 56-3747

[51] Int. Cl.³ .......................... C09J 5/02; B32B 17/00
[52] U.S. Cl. ................................ 156/308.6; 156/334; 156/309.3; 428/441; 428/461; 428/516; 428/420
[58] Field of Search ................. 156/334, 308.6, 309.3; 260/33.6 PQ, 33.8 UA; 264/343; 428/441, 461, 516, 420; 524/579; 526/348.2–348.5

[56] References Cited

U.S. PATENT DOCUMENTS 3,029,215 4/1962 Campbell .................... 260/33.6 PQ
3,442,737 5/1969 Reed et al. .................. 260/33.6 PQ
3,514,359 5/1970 Frese ................................. 156/334

FOREIGN PATENT DOCUMENTS 54-149386 11/1979 Japan .......................... 260/33.8 UA
55-52334 4/1980 Japan .......................... 260/33.6 PQ
56-41228 4/1981 Japan .......................... 260/33.6 PQ
1528414 10/1978 United Kingdom ................ 156/334

Primary Examiner—Edward C. Kimlin
Assistant Examiner—F. K. Wine
Attorney, Agent, or Firm—Sherman & Shalloway

[57] ABSTRACT

In bonding molded articles of a 4-methyl-1-pentene polymer to each other or bonding a molded article of a 4-methyl-1-pentene polymer to a molded article comprised of a vinyl alcohol type polymer, metal or glass, if a solution of a modified 4-methyl-1-pentene polymer in cyclohexene and/or carbon tetrachloride is coated on at least one of the molded articles to be bonded, the adhesion strength can remarkably be improved.

5 Claims, 2 Drawing Figures

U.S. Patent     Jun. 7, 1983     4,386,991
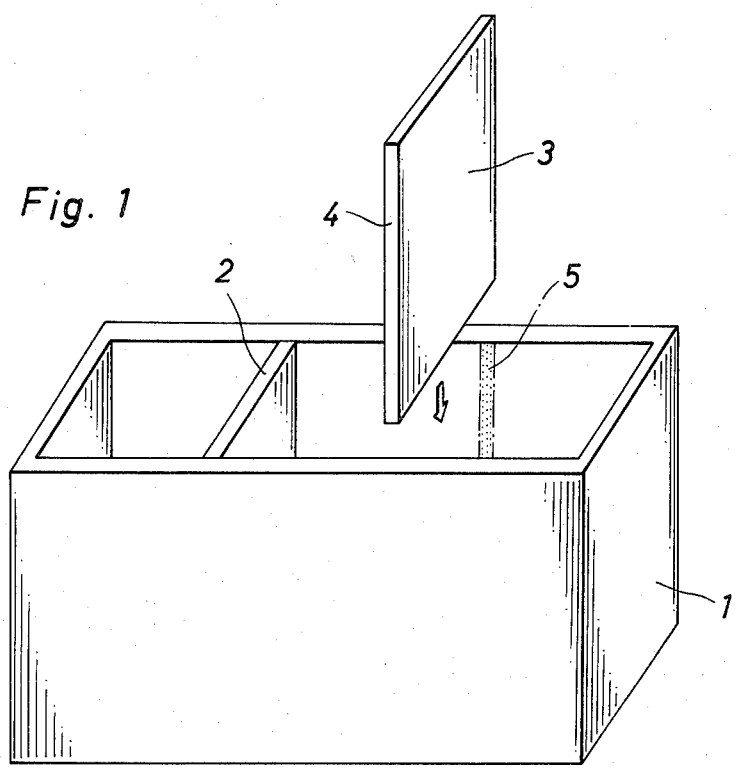
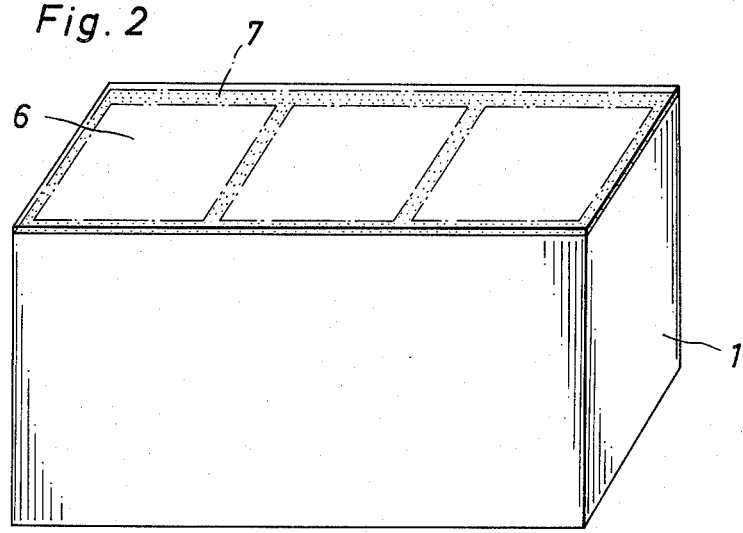

METHOD OF BONDING 4-METHYL-1-PENTENE POLYMERS

BACKGROUND OF THE INVENTION (1) Field of the Invention

The present invention relates to a method of bonding molded articles comprised of a 4-methyl-1-pentene polymer to each other or bonding a molded article comprised of a 4-methyl-1-pentene polymer to a molded article comprised of a vinyl alcohol type polymer, metal or glass. More particularly, the present invention relates to an improvement of this bonding method in which the adhesion strength can be enhanced.

(2) Description of the Prior Art

4-Methyl-1-pentene polymers are excellent in the heat resistance, transparency and other properties. Accordingly, these polymers are widely used for the manufacture of vessels for physical and chemical experiments, table wares for electronic oven treatments, percolators, syringes for medical treatments and paper coatings for food vessels. Although 4-methyl-1-pentene polymers are excellent in the heat resistance and other properties, they are somewhat defective in the moldability because the melting point is high. Therefore, it is very difficult to prepare a molded article having a complicated configuration directly from a 4-methyl-1-pentene polymer according to the melt-molding method.

Accordingly, in order to obtain an article having a complicated configuration from a 4-methyl-1-pentene polymer, it is inevitably necessary to bond molded articles comprised of a 4-methyl-1-pentene polymer to each other. So far as we know, there has not been developed a technique capable of providing a bonding having an adhesion strength of a practical level of at least about 5 Kg/cm$^2$ in bonding molded articles comprised of a 4-methyl-1-pentene polymer to each other.

Furthermore, 4-methyl-1-pentene polymers are defective in that the adhesion to other materials such as metals is inferior. Accordingly, expansion of the application fields of 4-methyl-1-pentene polymers is restricted by such poor adhesion.

The gas barrier property of a 4-methyl-1-pentene polymer is inferior to that of other polyolefin such as polyethylene, polypropylene or poly-1-butene. Accordingly, the 4-methyl-1-pentene polymer is hardly used as an ordinary packing material. As means for improving the gas barrier property or surface hardness in the 4-methyl-1-pentene polymer while retaining excellent characteristics of this polymer, there is adopted a method in which other material such as polyvinyl chloride, nylon, vinyl alcohol type polymer, metal, glass or the like is laminated on the 4-methyl-1-pentene polymer. In this method, it is necessary to form a bonding having a strength sufficient to resist practical applications between the 4-methyl-1-pentene polymer and the laminated material.

For bonding a polyolefin to other material, there has been adopted a method in which the polyolefin is modified with a carboxylic acid or the like to impart polar groups to the polyolefin and improve the adhesion of the polyolefin to other material. However, even if such modified polyolefin is used, a practical adhesion strength cannot be obtained at normal temperatures, and in order to obtain a practical adhesion strength, it is necessary to perform the bonding operation at a temperature higher than the softening point of the modified polyolefin. This problem is especially serious in case of a 4-methyl-1-pentene polymer, because the softening point and melting point of this polymer are much higher than those of other polyolefins and the bonding operation should be carried out at much higher temperatures for obtaining a practical adhesion strength.

BRIEF SUMMARY OF THE INVENTION

It is therefore a primary object of the present invention to provide a method in which a molded article comprised of a 4-methyl-1-pentene polymer can be bonded tightly to a molded article comprised of a 4-methyl-1-pentene polymer or a molded article comprised of a vinyl alcohol type polymer, metal or glass even at normal temperatures by simple means.

In accordance with the present invention, there is provided a method of bonding molded articles comprised of a 4-methyl-1-pentene polymer to each other or bonding a molded article comprised of a 4-methyl-1-pentene polymer to a molded article comprised of a vinyl alcohol type polymer, metal or glass, which comprises coating a solution of a modified 4-methyl-1-pentene polymer in cyclohexene and/or carbon tetrachloride on the surface to be bonded of at least one of the molded articles and then bonding the molded articles.

Other objects and features of the present invention will become apparent from the detailed description given hereinafter.

BRIEF DESCRIPTION OF THE DRAWINGS

FIG. 1 is a perspective view illustrating an embodiment in which the bonding method of the present invention is applied to the manufacture of a cell for the hematoscopy.

FIG. 2 is a perspective view illustrating the state where a reagent for the hematoscopy is packed in the cell shown in FIG. 1 in advance and a cover of a protective film is bonded thereto.

DETAILED DESCRIPTION OF THE PREFERRED EMBODIMENTS

As the molded article used in the present invention, there can be mentioned molded articles in the form of a film, a sheet, a vessel, a rope, a thread, a non-woven fabric or the like, which are prepared from 4-methyl-1-pentene polymers (hereinafter referred as "4M1P") or polymer compositions comprising 4M1P as the main component according to various molding methods such as melt molding, casting molding and compression molding. The uses of these molded articles are not particularly limited, and they may be used as separating membranes, packaging materials, coated electric wires, insulating materials and the like.

In the present invention, 4M1P includes homopolymers of 4-methyl-1-pentene, copolymers of 4-methyl-1-pentene with at least one member selected from 1-olefins having about 2 to about 18 carbon atoms, such as ethylene, propylene, 1-butene, 1-hexene, 1-octene and 1-decene, and grafted copolymers obtained by grafting these homopolymers or copolymers with an unsaturated carboxylic acid such as acrylic acid, methacrylic acid, maleic acid or maleic anhydride. If the content of the 4-methyl-1-pentene monomer in such 4M1P is at least 50 mole %, especially at least 80 mole %, the excellent heat resistance and transparency of the polymer can effectively be utilized.

Additives customarily incorporated into resins of molded articles, such as stabilizers, coloring materials, organic fillers and inorganic fillers, may be added to the abovementioned polymers according to need. Furthermore, small amounts of other resins or rubbers may be incorporated into these polymers.

In the present invention, it is important that a solution of a modified 4-methyl-1-pentene polymer in cyclohexene and/or carbon tetrachloride should be coated on the surface to be bonded of at least one of the molded articles prior to the bonding operation. As the modified 4-methyl-1-pentene polymer, there may be used a thermal degradation product and a modification product by addition of oxygen or halogen. More specifically, there can be mentioned (1) a modification product obtained by performing thermal degradation in the presence of an organic peroxide such as dicumyl peroxide or in air in the presence or absence of a solvent, and (2) an oxygen-added modification product obtained by partially or completely grafting a 4-methyl-1-pentene polymer with an unsaturated carboxylic acid such as acrylic acid, methacrylic acid, maleic acid, fumaric acid or itaconic acid or an unsaturated carboxylic acid derivative such as an acid anhydride, an ester, an amide or an imide. This graft copolymerization is accomplished by heating at high temperatures in the presence or absence of a solvent with or without addition of a radical generator. Furthermore, there can be mentioned (3) a modification product obtained by partially or completely grafting a 4-methyl-1-pentene polymer with an unsaturated epoxy compound such as glycidyl acrylate, glycidyl methacrylate, a mono- or di-glycidyl ester of itaconic acid or a mono- or di-glycidyl ester of endobicyclo[2,2,1]hepto-5-ene-2,3-dicarboxylic acid (marketed under tradename "Nadic Acid"). This graft copolymerization is accomplished by heating at temperatures in the presence or absence of a solvent with or without addition of a radical initiator. Moreover, there can be mentioned (4) a modification product obtained by treating a 4-methyl-1-pentene/butadiene copolymer with a peroxide such as peracetic acid. As the modification product obtained by addition of halogen, there can be mentioned (5) a chlorination product obtained by blowing molecular chlorine in a 4-methyl-1-pentene polymer in the presence of a solvent. Among these modified polymers, the modification products (1), (2) and (5) are preferred. As the modification product (1), a product obtained by treating a 4-methyl-1-pentene polymer having a $[\eta]$ value of about 2 to 15 dl/g with a peroxide so that the $[\eta]$ value is reduced by about 5 to about 95% is especially preferred. As the modification product (2), a grafted polymer in which the content of the unsaturated carboxylic acid monomer grafted to the 1-methyl-4-pentene polymer is about 0.5 to about 5% by weight is especially preferred.

The above-mentioned modified 4-methyl-1-pentene polymer is dissolved in cyclohexene and/or carbon tetrachloride and coated on a molded article to be bonded. When other solvent is used, a necessary bonding force cannot be obtained. It is preferred that the modified polymer be used in the state completely dissolved in the solvent, but the modified polymer may be used even in the state where the modified polymer is partially undissolved or swollen. The concentration of the modified polymer may be changed in the range of about 0.1 to about 80 parts by weight per 100 parts by weight of the solvent.

As the vinyl alcohol type polymer to be bonded to the 4-methyl-1-pentene polymer, there can be mentioned a polymer obtained by saponifying polyvinyl acetate or an ethylene/vinyl acetate copolymer at a saponification degree of 90 to 100 mole %. A saponified ethylene/vinyl acetate copolymer having an ethylene content of 15 to 60 mole % is especially preferred because a good balance is established among the moldability, gas barrier property and mechanical properties in this polymer.

A metal can be mentioned as another material to be bonded to the 4-methyl-1-pentene polymer. For example, there may be used metals such as aluminum, iron, copper, tin and nickel, and alloys comprising at least one of these metals as the main component, such as stainless steel. Aluminum is especially preferred among these metals.

As the glass to be bonded to the 4-methyl-1-pentene polymer, there can be mentioned, for example, silicate glass, borate glass, borosilicate glass and phosphate glass. The silicate glass includes alkali metal silicate glass such as flint glass, soda ash glass such as crown glass or sheet glass, potash glass such as Bohemian glass or crystal glass, and barium glass such as barium flint glass. As the borosilicate glass, there can be mentioned low alkali glass such as Pyrex glass.

The coating solution comprising the modified 4-methyl-1-pentene polymer and cyclohexene and/or carbon tetrachloride is coated on the surface to be bonded according to known various coating methods such as spray coating, dip coating, brush coating and roll coating. Before coating of the coating solution on the surface to be bonded, the 4-methyl-1-pentene polymer or the vinyl alcohol type polymer, metal or glass to be bonded is preferably subjected to the degreasing treatment. The coating solution is applied to the surface of at least one of the molded articles to be bonded.

The method of the present invention is advantageous over the conventional methods in that the bonding operation can be accomplished by coating the coating solution on the surface to be bonded at a temperature lower than the melting point of the modified 4-methyl-1-pentene polymer, preferably a temperature lower than 50° C., especially preferably a normal temperature, and pressing the surfaces to be bonded at this low temperature. Of course, bonding can be accelerated by appropriate heating according to need.

In the present invention, it is important that a solution of a modified 4-methyl-1-pentene polymer such as mentioned above in cyclohexene and/or carbon tetrachloride should be used as the coating solution to be applied to at least one of the surfaces to be bonded. If other solvent is used, no satisfactory bonding can be obtained. Also incorporation of modified 4M1P into the abovementioned specific solvent is important, and if unmodified 4M1P is used, a bonding strength sufficient to resist practical applications cannot be obtained.

In the present invention, the amount of the coating solution to be applied to the surface to be bonded is not particularly critical, so far as the entire surface to be bonded is uniformly wetted with the coating solution. However, it is ordinarily preferred that the coating solution be applied so that the amount of the coating is 5 to 1000 mg/dm$^2$ on the wet weight basis.

Application of the present invention to the manufacture of a cell for the hematoscopy will now be described in detail with reference to the accompanying drawings.

FIG. 1 is a perspective view illustrating an embodiment in which a partition plate 2 is bonded to a cell 1 of 4M1P and another partition plate 3 of 4M1P is further bonded to the cell 1. A solution of 4M1P graftcopolymerized with maleic anhydride in cyclohexene and/or carbon tetrachloride is coated on the portion 4, to be bonded to the cell 1, of the partition plate 3, and the partition plate 3 is pressed to the cell 1 to effect bonding. It is preferred that the above coating solution also be applied to the cell 1.

FIG. 2 is a perspective view illustrating the state in which a reagent for the hematoscopy is packed in the cell 1 and a cover of a protective film 6 of 4M1P is then bonded to the cell 1 from above.

The above-mentioned coating solution of the modified 4M1P in cyclohexene and/or carbon tetrachloride is applied to the surface to be bonded between the cell 1 of 4M1P and the film 6, and the film 6 is then pressed to the cell 1, whereby the film 6 is tightly bonded to the cell 1. Reagents packed in the respective chambers of the cell 1 can be stored stably and safely without mingling thereof.

According to this embodiment of the present invention, bonding of molded articles of 4M1P to each other can be accomplished very easily and a strong bonding can be obtained in the bonded area.

According to another embodiment of the present invention, a molded article of 4M1P is bonded to a molded article of a vinyl alcohol type polymer, metal or glass according to procedures similar to those described above, whereby a laminate structure being excellent in the heat resistance and hot water resistance and having a good gas barrier property can easily be obtained at normal temperatures. The so obtained laminate structure is effectively used as a film for a retortable pouch or a vessel used for hot packing.

The present invention will now be described in detail with reference to the following Examples that by no means limit the scope of the invention.

EXAMPLES 1 THROUGH 5 AND COMPARATIVE EXAMPLE 1

Test pieces having a size of 100 mm×20 mm×2 mm were prepared from a 4-methyl-1-pentene polymer (TPX ®RT-18 supplied by Mitsui Petrochemical Industries, Ltd.) by injection molding. A cyclohexene solution of a modified 4-methyl-1-pentene polymer shown in Table 1 (obtained by modifying the above-mentioned TPX ®) was coated on the surface to be bonded of each of two test pieces and the test pieces were piled together so that the bonding area was 20 mm×20 mm. The test pieces were fixed by clips and allowed to stand still for about 1 day. The test pieces were kept at room temperature and the applied modified TPX solution was kept at room temperature.

With respect to each of the so obtained bonded structures, the tensile shear bonding strength was measured as the bonding strength of the bonded portion by using an Instron tester.

The obtained results are shown in Table 1.

TABLE 1

| | Modified 4M1P (Modified TPX) | | | |
|---|---|---|---|---|
| | Kind and Properties | Concentration (% by weight) | Organic Solvent | Tensile Shear Strength (Kg/cm$^2$) |
| Example 1 | thermal degradation product*, $[\eta]$ = 2.18, Tm = 230° C. | 2 | cyclohexene | 20 |
| Example 2 | thermal degradation product*, $[\eta]$ = 3.30, Tm = 232° C. | 2 | cyclohexene | 17 |
| Example 3 | thermal degradation product*, $[\eta]$ = 4.12, Tm = 227° C. | 2 | cyclohexene | 19 |
| Example 4 | maleic anhydride(3.6% by weight)-grafted copolymer** | 5 | carbon tetrachloride | 15 |
| Example 5 | chlorinated polymer*** | 10 | cyclohexene | 17 |
| Comparative Example 1 | commercially available silicone resin**** | 50 | toluene | 5 |

EXAMPLE 6

A 4-methyl-1-pentene polymer (TPX ®RT-18 supplied by Mitsui Petrochemical Industries, Ltd.) was dissolved in toluene, and maleic anhydride and dicumyl peroxide were added to the solution to effect grafting reaction, whereby a maleic anhydride-grafted modified 4-methyl-1-pentene polymer having a grafted maleic anhydride content of 3.6% by weight and an intrinsic viscosity of 1.23 dl/g as measured in decalin as the solvent at 135° C. (hereinafter referred to as "MAH-TPX") was obtained. Then, 5 g of MAH-TPX was dissolved in 100 ml of carbon tetrachloride to obtain an adhesive (hereinafter referred to as "adhesive I").

Separately, a test piece having a size of 100 mm×25 mm×2 mm was prepared from TPX ®RT-18 by injection molding. The surface to be bonded of the test piece was degreased with acetone and the adhesive I was coated thereon. Then, a test piece having a size of 100 mm×25 mm×2 mm, which was prepared from a saponified ethylene/vinyl acetate copolymer (Eval ®EP-F supplied by Kuraray Co. Ltd.) and subjected to the degreasing treatment, was pressed and bonded to the adhesive-coated surface of the above test piece. The bonding area was adjusted to 25 mm×25 mm. The bonded test pieces were fixed by clips and allowed to stand still at room temperature for 2 days. The tensile shear bonding strength was measured at a pulling speed of 50 mm/min by using an Instron type tensile tester (Model 1122 supplied by Instron Co., U.S.A.). The obtained results are shown in Table 2.

EXAMPLE 7

The experiment was carried out in the same manner as described in Example 6 except that an aluminum sheet was used instead of Eval ® used in Example 6. The obtained results are shown in Table 2.

EXAMPLE 8

An adhesive (hereinafter referred to as "adhesive II") was prepared in the same manner as described in Example 6 except that cyclohexene was used instead of carbon tetrachloride. The experiment was carried out in the same manner as described in Example 7 except that the adhesive II was used instead of the adhesive I. The obtained results are shown in Table 2.

EXAMPLE 9

The experiment was carried out in the same manner as described in Example 6 except that a test piece of TPX®MX-004 (4-methyl-1-pentene polymer supplied by Mitsui Petrochemical Industries, Ltd., $[\eta]=2.1$, Tm=238° C.) was used instead of the test piece of TPX®RT-18 used in Example 6. The obtained results are shown in Table 2.

EXAMPLE 10

The experiment was carried out in the same manner as described in Example 7 except that a test piece of TPX®MX-004 was used instead of TPX®RT-18 used in Example 7. The obtained results are shown in Table 2.

EXAMPLE 11

The experiment was carried out in the same manner as described in Example 8 except that a test piece of TPX®MX-004 was used instead of TPX®RT-18 used in Example 8. The obtained results are shown in Table 2.

EXAMPLE 12

TPX®RT-18 was reacted with chlorine gas in carbon tetrachloride at 70° C. in the presence of octanoyl peroxide, and the reaction mixture was poured into methanol to precipitate and recover a chlorinated 4-methyl-1-pentene polymer (hereinafter referred to as "chlorinated TPX"). Then, 10 g of the so obtained chlorinated TPX was dissolved in 100 ml of cyclohexene to obtain an adhesive (hereinafter referred to as "adhesive III"). A laminate structure of TPX®RT-18 and Eval® was prepared in the same manner as described in Example 6 by using the so prepared adhesive III. The obtained results are shown in Table 2.

COMPARATIVE EXAMPLES 2 THROUGH 8

The experiment was carried out in the same manner as described in Example 6 except that an ABS resin (2 mm-thick sheet supplied by Shin Kobe Denki Kabushiki Kaisha), an acrylic resin (2 mm-thick sheet supplied by Sumitomo Kagaku Kabushiki Kaisha), nylon-6 (2 mm-thick sheet supplied by Dainippon Plastics Kabushiki Kaisha), polycarbonate (2 mm-thick sheet supplied by Takiron Kagaku Kabushiki Kaisha), soft polyvinyl chloride (2 mm-thick sheet supplied by Takiron Kagaku Kabushiki Kaisha), rigid polyvinyl chloride (2 mm-thick sheet supplied by Takiron Kagaku Kabushiki Kaisha) or polyacetal (2 mm-thick sheet supplied by Dainippon Plastics Kabushiki Kaisha) was used instead of the saponified ethylene/vinyl acetate copolymer used in Example 6. The obtained results are shown in Table 2.

COMPARATIVE EXAMPLE 9

An adhesive (hereinafter referred to as "adhesive IV") was prepared in the same manner as described in Example 6 except that toluene was used instead of carbon tetrachloride used in Example 6. The experiment was carried out in the same manner as described in Example 6 except that the so prepared adhesive IV was used instead of the adhesive I used in Example 6. The obtained results are shown in Table 2.

COMPARATIVE EXAMPLE 10

An adhesive (hereinafter referred to as "adhesive V") was prepared in the same manner as described in Example 6 except that TPX®RT-18 was dissolved in carbon tetrachloride instead of MAH-TPX dissolved in Example 6. The experiment was carried out in the same manner as described in Example 6 except that the so prepared adhesive V was used instead of the adhesive I used in Example 6. The obtained results are shown in Table 2.

EXAMPLE 13

The experiment was carried out in the same manner as described in Example 6 except that slide glass for microscope having a thickness of 1 mm was used instead of Eval® used in Example 6. The obtained results are shown in Table 2.

TABLE 2

| | 4-Methyl-1-Pentene Polymer | Material Bonded | Adhesive | Tensile Shear Strength (Kg/cm$^2$) |
|---|---|---|---|---|
| Example 6 | TPX® RT-18 | Eval® | I | 12.5 |
| Example 7 | " | aluminum | I | 6.9 |
| Example 8 | " | aluminum | II | 12.5 |
| Example 9 | TPX® MX-004 | Eval® | I | 10.0 |
| Example 10 | " | aluminum | I | 7.2 |
| Example 11 | " | aluminum | II | 11.9 |
| Example 12 | TPX® RT-18 | Eval® | III | 8.1 |
| Comparative Example 2 | " | ABS resin | I | 1.9 |
| Comparative Example 3 | " | acrylic resin | I | 1.4 |
| Comparative Example 4 | " | nylon-6 | I | 2.0 |
| Comparative Example 5 | " | polycarbonate | I | 0.8 |
| Comparative Example 6 | " | soft PVC | I | 0.8 |
| Comparative Example 7 | " | rigid PVC | I | 0.9 |
| Comparative Example 8 | " | polyacetal | I | 0.6 |
| Comparative Example 9 | " | Eval® | IV | 3.9 |
| Comparative Example 10 | " | " | V | 1.56 |
| Example 13 | " | glass | I | 10.0 |

What we claim is:

1. A method of bonding a molded article comprised of a 4-methyl-1-pentene polymer wherein the content of the 4-methyl-1-pentene monomer in the 4-methyl-1-pentene polymer of the molded article to be bonded is at least 80 mole% to a molded article comprised of a vinyl alcohol type polymer, metal or glass, which comprises coating a solution of a modified 4-methyl-1-pentene polymer dissolved in cyclohexene and/or carbon tetrachloride on the surface to be bonded of at least one of the molded articles at a temperature lower than 50° C. and then bonding the molded articles.

2. A bonding method according to claim 1, wherein the modified 4-methyl-1-pentene polymer is a thermally degraded 4-methyl-1-pentene polymer or a modified 4-methyl-1-pentene polymer obtained by addition of oxygen and/or halogen.

3. A bonding method according to claim 1 wherein the molded article comprised of 4-methyl-1-pentene polymer is bonded to a molded article comprised of a vinyl alcohol type polymer.

4. A bonding method according to claim 1 wherein the molded article comprised of 4-methyl-1-pentene polymer is bonded to a molded article comprised of metal.

5. A bonding method according to claim 1 wherein the molded article comprised of 4-methyl-1-pentene polymer is bonded to a molded article comprised of glass.

* * * * *